United States Patent
Sato

(10) Patent No.: US 7,730,400 B2
(45) Date of Patent: Jun. 1, 2010

(54) DISPLAY UNIT WITH TOUCH PANEL, METHOD OF CONTROLLING THE SAME, AND COMPUTER PRODUCTS

(75) Inventor: Mitsuru Sato, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1538 days.

(21) Appl. No.: 10/436,058

(22) Filed: May 13, 2003

(65) Prior Publication Data

US 2004/0027397 A1    Feb. 12, 2004

(30) Foreign Application Priority Data

May 13, 2002    (JP)    ............... 2002-137838

(51) Int. Cl.
    *G06F 3/01*    (2006.01)
(52) U.S. Cl. .............. 715/701; 715/702; 715/863; 399/185
(58) Field of Classification Search .......... 715/863, 715/701–702; 399/185
    See application file for complete search history.

(56) References Cited

U.S. PATENT DOCUMENTS

| | | | | |
|---|---|---|---|---|
| 5,621,438 A * | 4/1997 | Kamimura et al. | .......... | 345/178 |
| 5,798,766 A * | 8/1998 | Hayashi et al. | ............ | 345/595 |
| 6,184,860 B1 * | 2/2001 | Yamakawa | .................. | 715/823 |
| 6,320,601 B1 * | 11/2001 | Takasu et al. | ............... | 715/764 |
| 6,594,023 B1 | 7/2003 | Omura et al. | | |
| 6,643,824 B1 * | 11/2003 | Bates et al. | .............. | 715/501.1 |
| 7,020,269 B1 * | 3/2006 | Park et al. | ............. | 379/355.01 |
| 2002/0113797 A1 * | 8/2002 | Potter et al. | ................. | 345/581 |
| 2002/0141643 A1 * | 10/2002 | Jaeger | ....................... | 382/181 |

FOREIGN PATENT DOCUMENTS

| | | |
|---|---|---|
| JP | 6-175775 | 6/1994 |
| JP | 8-211992 | 8/1996 |
| JP | 9-44329 | 2/1997 |
| JP | 10-154224 | 6/1998 |
| JP | 2001-075721 | 3/2001 |

OTHER PUBLICATIONS

U.S. Appl. No. 10/103,964, filed Mar. 25, 2002, Satoh.
U.S. Appl. No. 10/436,058, filed May 13, 2003, Satoh.

* cited by examiner

*Primary Examiner*—Simon Ke
(74) *Attorney, Agent, or Firm*—Oblon, Spivak, McClelland, Maier & Neustadt, L.L.P.

(57) ABSTRACT

A display unit includes a touch point locus detector that detects a locus of a touch point on the touch panel, and a suspended touch detector that detects that the touch is suspended when the touch point remains at rest at one spot for at least a predetermined time period while the locus is detected. The display unit also includes a graphics identifying section that identifies a graphics indicated by the locus when the suspended touch is detected, and a graphics display section that displays the locus on a display screen, erases the displayed locus after the graphics identification is finished, and displays a graphics obtained through the identification on the display screen.

44 Claims, 13 Drawing Sheets

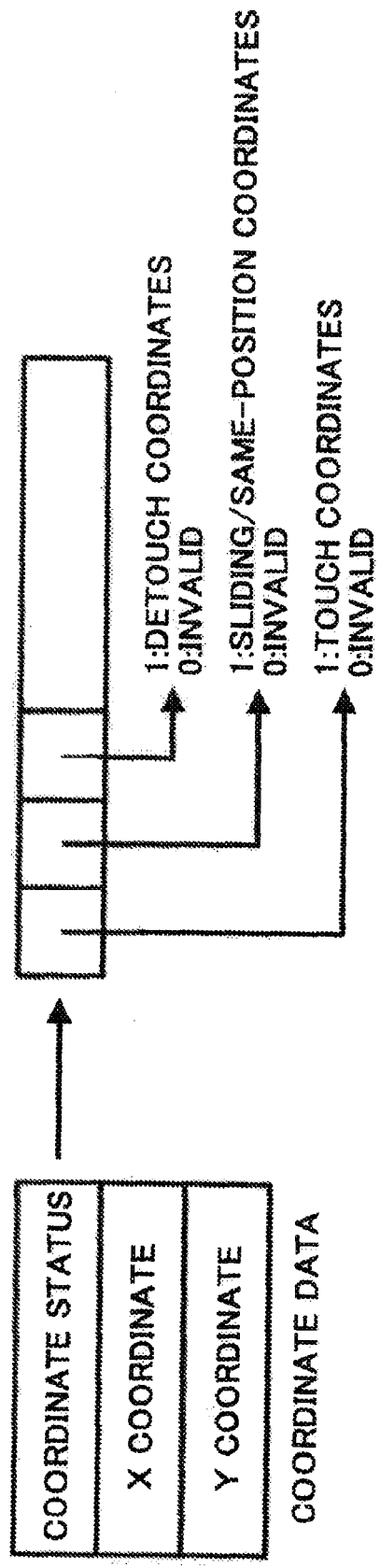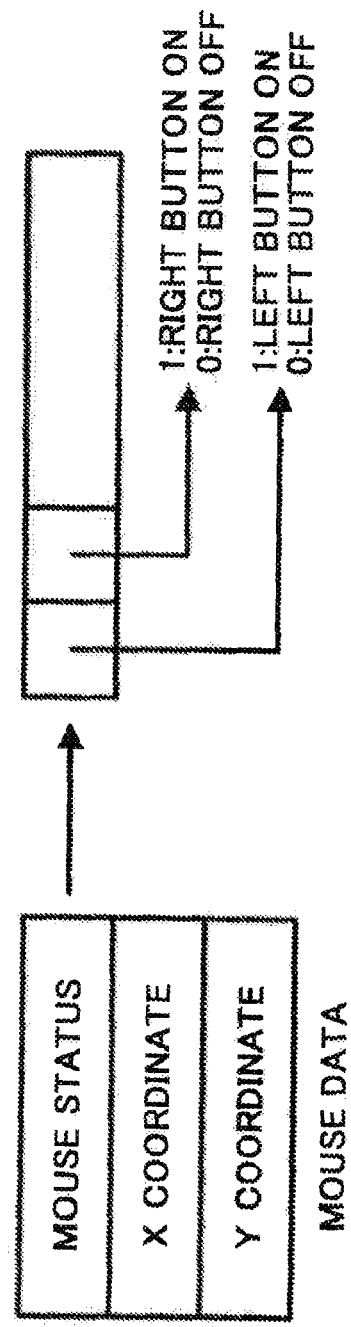

DISPLAY UNIT WITH TOUCH PANEL, METHOD OF CONTROLLING THE SAME, AND COMPUTER PRODUCTS

BACKGROUND OF THE INVENTION

1) Field of the Invention

The present invention relates to a display unit with a touch panel in which a display screen and a coordinate input unit are integrated, a method of controlling the display unit, and computer products.

2) Description of the Related Art

Recently, a display unit with a touch panel is coming into wide use. The display unit has a display screen and a coordinate input unit integrated into one, and can control an image displayed on the display screen while the user touches the display screen. Another type of display unit with a touch panel of relatively a large size is also increasing. This type of display unit is equal to the size of a blackboard or a whiteboard, and is used for giving lectures at schools or making presentations at company.

The display unit with a touch panel enables a speaker to write information on an image displayed on the display screen or enlarge a part of the displayed image by touching the display screen. Therefore, when the speaker uses the display unit to make a presentation, the audience can understand the presentation more easily. As it is also possible to quickly change or switch the displayed image, there is an advantage that the speaker can smoothly proceed with the presentation.

During the presentation, the speaker needs in many cases to draw a graphics such as an arrow, a circle, or a triangle, in addition to characters. In drawing a graphics, it is general that the speaker uses a graphics drawing tool such as a pen or an eraser displayed on the display screen. When a display unit with a large touch panel is used to make a presentation, it often occurs that the speaker cannot draw a graphics at a desired position with the graphics drawing tool while standing at a certain position. In this case, the speaker must move across the display screen in order to operate the tool during the presentation.

When the speaker moves across the screen during the presentation, both the speaker and the audience lose concentration, and this may interrupt the smooth proceeding with the presentation. The moving during the presentation may give a physical stress to some speakers. When the speaker feels it troublesome to operate the graphics drawing, the operability of the display unit with a touch panel may be lowered.

SUMMARY OF THE INVENTION

It is an object of this invention to solve at least the problems in the conventional technology.

The display unit with a touch panel according to one aspect of this invention displays a graphics drawn using the touch panel on a display screen. The display unit includes a touch point locus detecting unit that detects a locus of continuous movement of a touch point that indicates a position of a touch made by an object on the touch panel, and a suspended touch detecting unit that detects that the touch is suspended when the touch point remains at rest at one spot for at least a predetermined time period without touch release during detection of the locus by the touch point locus detecting unit. The display unit also includes a graphics identifying unit that identifies a graphics of the locus detected by the touch point locus detecting unit, when the suspended touch detecting unit detects that the touch is suspended, and a graphics display unit that displays the locus detected by the touch point locus detecting unit on the display screen, erases the displayed locus after the graphics identifying unit ends the identification of the graphics, and displays the graphics obtained as a result of the identification on the display screen.

The display unit with a touch panel according to another aspect of this invention displays a graphics drawn using the touch panel on a display screen. The display unit includes a touch point locus detecting unit that detects a locus of continuous movement of a touch point that indicates a position of a touch made by an object on the touch panel, and a suspended touch detecting unit that detects that the touch is suspended when the touch point remains at rest at one spot for at least a predetermined time period without touch release during detection of the locus by the touch point locus detecting unit. The display unit also includes a graphics identifying unit that identifies a graphics of the locus detected by the touch point locus detecting unit, when the suspended touch detecting unit detects that the touch is suspended, and a graphics display unit that displays the locus detected by the touch point locus detecting unit on the display screen, erases the displayed locus and displays the graphics obtained as a result of the identification on the display screen when the graphics identifying unit has identified the graphics, and erases the displayed locus when the graphics identifying unit has failed to identify the graphics.

In the method of controlling a display unit with a touch panel according to still another aspect of this invention, the display unit displays a graphics drawn using the touch panel on a display screen. The method includes the steps of displaying a locus of continuous movement of a touch point that indicates a position of a touch made by an object on the touch panel, on the display screen, and detecting that the touch is suspended when the touch point remains at rest at one spot for at least a predetermined time period without touch release while the touch point locus is displayed. The method also includes the steps of identifying a graphics indicated by a locus of the touch point when the suspended touch detecting unit detects that the touch is suspended, erasing the displayed locus after the graphics has been identified at the step of identifying the graphics, and displaying the graphics obtained as a result of the identification, on the display screen.

In the method of controlling a display unit with a touch panel according to still another aspect of this invention, the display unit displays a graphics drawn using the touch panel on a display screen. The method includes the steps of displaying a locus of continuous movement of a touch point that indicates a position of a touch made by an object on the touch panel, on the display screen, and detecting that the touch is suspended when the touch point remains at rest at one spot for at least a predetermined time period without touch release while the touch point locus is displayed. The method also includes the steps of identifying a graphics indicated by a locus of the touch point when the suspended touch detecting unit detects that the touch is suspended, erasing the displayed locus after the graphics has been identified at the step of identifying the graphics and displaying the graphics obtained as a result of the identification on the display screen, and erasing the displayed locus when graphics identification is failed.

The program according to still another aspect of this invention allows a computer to execute either one of the methods according to the present invention.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIGS. 4A and 4B show a format of detection data and a format of mouse data according to the embodiment;

DETAILED DESCRIPTION

Figure 1:
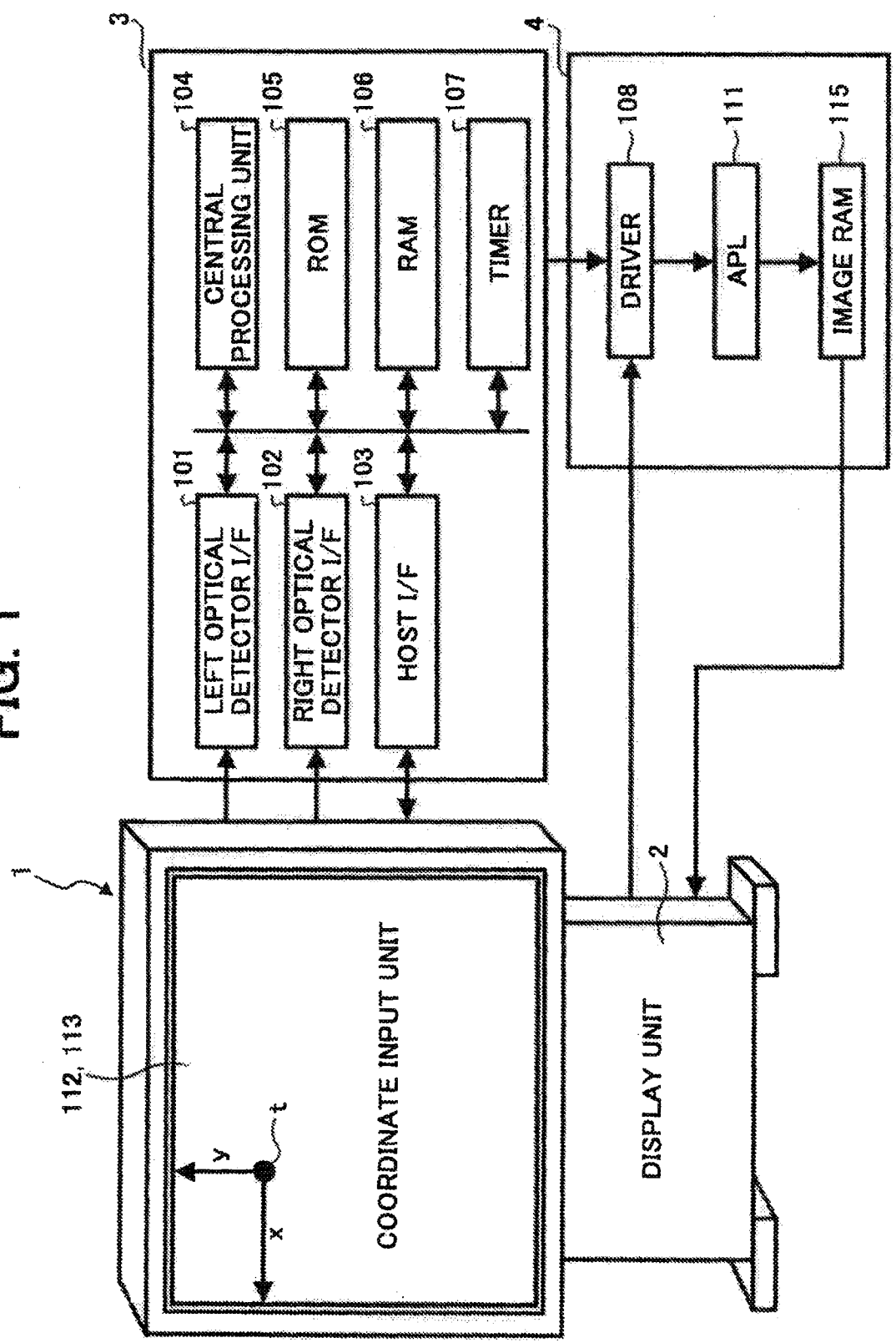
FIG. 1 shows a display unit with a touch panel according to an embodiment of the present invention.

Exemplary embodiments of the display unit with a touch panel according to the present invention are explained in detail below with reference to the accompanying drawings. FIG. 1 shows a display unit with a touch panel according to the embodiment. The display unit with a touch panel shown in FIG. 1 includes a coordinate input unit 1 of touch panel type, a coordinate detector 3 that detects coordinates input to the coordinate input unit 1, a host unit 4 that controls image data based on the coordinates detected by the coordinate detector 3, and a display unit 2 that displays the image data (such as red (R), green (G), and blue (B)) controlled by the host unit 4 on a display screen such as a liquid crystal screen and a plasma display panel (PDP). In the present specification, a combined structure of the coordinate input unit 1 and the coordinate detector 3 is also referred to as a touch panel.

On the display unit with a touch panel according to the embodiment, a display screen 113 is provided over on a coordinate input screen 112 of the coordinate input unit 1. The display unit 2 displays image data on the display screen 113. The coordinate input screen 112 is an area on which the coordinate detector 3 can detect coordinates. The display unit with a touch panel according to the embodiment has such a structure that a speaker directly touches the display screen 113, and therefore the coordinate input screen 112 is a virtual screen.

The coordinate input unit 1 has optical detectors described later. The optical detectors optically detect whether a finger or a pen is touched on or the finger or the pen is lifted off the display screen 113. The coordinate input unit 1 inputs the data detected by the optical detectors into the coordinate detector 3. The coordinate detector 3 calculates coordinates (x, y) of a point (that is, a touch point) touched on the coordinate input screen 112. The coordinates calculated are expressed in terms of numbers of pixels (for example, x=1024, and y=768) on the display screen 113, and are periodically output to the coordinate detector 3 at every 10 ms or 20 ms. The coordinate calculation of the touch point carried out by the coordinate detector 3 is explained in detail later.

The coordinate detector 3 includes a left optical detector interface (I/F) 101 and a right optical detector I/F 102 that respectively input data detected by the optical detectors described later, a central processing unit 104 that controls the overall coordinate detector 3, a read only memory (ROM) 105 that stores a program used by the central processing unit 104, a random access memory (RAM) 106 that temporarily stores work data of the central processing unit 104, and a timer (TIMER) 107 that periodically measures time and inputs the measured time into the central processing unit 104.

The host unit 4 is a personal computer (PC), and is installed with a versatile operating system (OS) such as Windows, Mac OS, or Linux. Each operating system controls the image data. The host unit 4 has a driver 108 as a program (that is, a device driver, or what is called driver software) executed under the control of a versatile operating system, an APL 111 as one of applications that operate under the control of a common versatile operating system, and an image RAM 115 that temporarily stores the image data.

In the embodiment, a touch with a finger or a pen on the coordinate input screen 112 is called "touch", and a touched point is called a "touch point". A leaving of a finger or a pen from the touch point, that is, touch release is called "detouch". A sliding of a finger or a pen over the coordinate input screen 112 in a touched state without detouching is called "sliding touch" (drag). A continuous detection of touch at the same touch point without detouching is called a "same-position touch".

In deciding the same-position touch, it is not necessary that the touch point last time and the touch point this time exactly coincide with each other. When a distance between the touch point last time and the touch point this time is not larger than a predetermined length, they are regarded as the same-position touch. It is preferable that the predetermined length is about one point to three points, where the one point is a coordinate distance determined based on the size of the display screen and the number of pixels.

Figure 2:
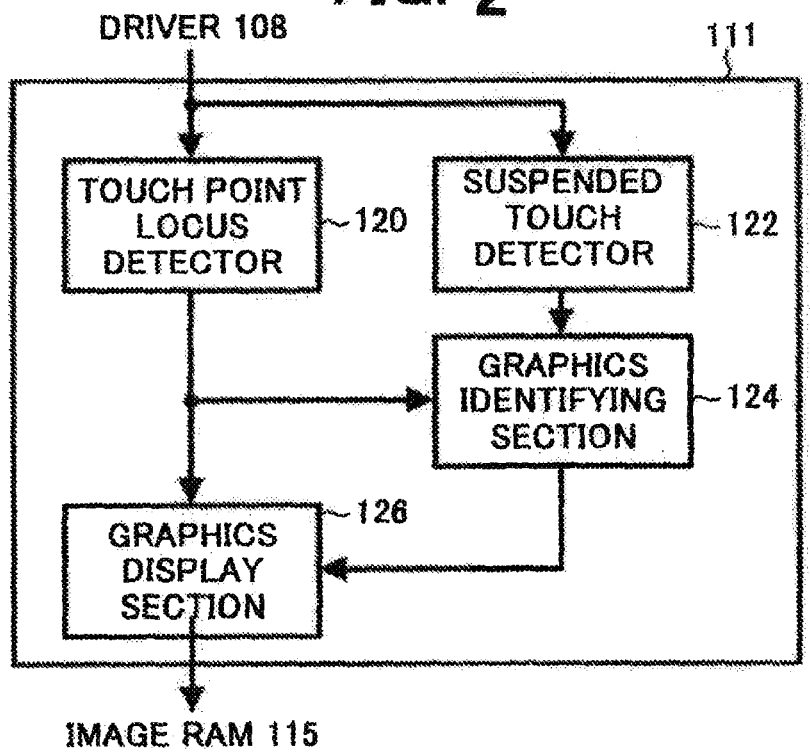
FIG. 2 is a functional block diagram of an application APL according to the embodiment.

FIG. 2 is a functional block diagram of the APL 111. The APL 111 includes a touch point locus detector 120 that detects a locus of a continuous movement of a touch point, a suspended touch detector 122 that detects that the touch is suspended that is a state in which a touch point is at the same one point for at least a predetermined time period without detouching during detection of a touch by the touch point locus detector 120, a graphics identifying section 124 that identifies a graphics in which a detected locus shows when a suspended touch is detected, and a graphics display section 126 that displays the detected locus on the display unit 2, erases the displayed locus after the graphics has been decided, and displays the graphics obtained as a result of the decision made on the display screen 113.

When the graphics identifying section 124 has not enabled to decide a graphics, the graphics display section 126 erases the locus displayed on the display screen 113. When the touch point locus detector 120 detects a drag (that is the operation of moving a touch point without detouching) after erasing the locus, the graphics display section 126 displays again the locus detected by the touch point locus detector 120 on the display screen 113. Therefore, in the embodiment, the display unit has a storage, not shown, that stores the locus displayed on the display screen 113 after the graphics display section 126 erases the display of this locus.

The display unit with a touch panel based on the above structure operates as follows. When an operator touches the coordinate input screen 112 of the coordinate input unit 1, the coordinate input unit 1 outputs data indicating a touch point of this touch, to the coordinate detector 3. The coordinate detector 3 calculates coordinates of the touch point based on the data. The data for the coordinates (coordinate data) calculated by the coordinate detector 3 is passed to the driver 108 of the host unit 4, as detection data together with information about any one of the touch, the detouch, the sliding touch, and the same-position touch.

For example, while the operator manually draws a graphics on the coordinate input screen 112, a touch point moves continuously without detouching. Therefore, this touch is in the state of the sliding touch. When the operator ends the manual drawing of the graphics and suspends the move of the finger or the like at the drawing end point, the touch point does not move without detouching. Therefore, this touch is in the state of the same-position touch.

The driver 108 receives the detection data from the coordinate detector 3 via the RS232C or the universal serial bus (USB). The driver 108 converts the received detection data into a format of mouse data, that is, information about ON and OFF of the right button, the central button, and the left button of the mouse, and information about coordinates of a point at which the mouse is clicked.

The APL 111 receives the detection data from the driver 108 as the mouse data. Then, the APL 111 executes a function set in advance in relation to the coordinate data and the information about the ON of the buttons that are included in the received mouse data.

The function refers to, for example, drawing of a character, drawing of a graphics, and drawing of a ruled line in such a manner that the locus of a touch point is drawn with a line of a specific color and a specific thickness. The image data prepared by the APL 111 is expanded in the format expressed in colors R, G, and B, in the image RAM 115. The expanded image data is sent to the display unit 2. The display unit 2 displays the image data on the display screen 113.

Figure 3:
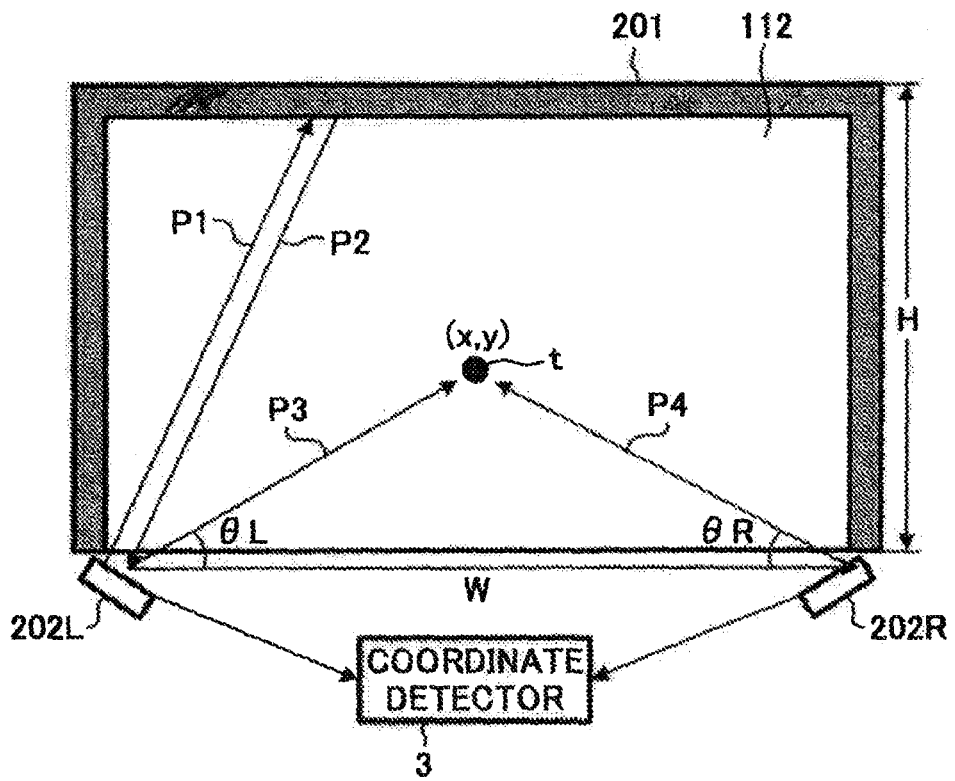
FIG. 3 shows a coordinate input unit shown in FIG. 1.

How to detect a touch point and how to calculate coordinates of the touch point in the display unit according to the embodiment are explained below. FIG. 3 shows the coordinate input unit according to the embodiment. The coordinate input unit 1 includes the coordinate input screen 112 in a rectangular shape having a height H and a width W as shown in the figure, a retroreflector 201 provided on three sides of the coordinate input screen 112, and a left optical detector 202L and a right optical detector 202R provided at both ends of one side of the coordinate input screen where the retroreflector 201 is not provided.

Each of the left optical detector 202L and the right optical detector 202R is a unit that has a light source (not shown) as a semiconductor laser and a light receiver (not shown) utilizing a charged-coupled device (CCD) integrated together. The light source emits light to the whole area of the coordinate input screen 112 in a sector shape whose pivot is the light source. When the left optical detector 202L and the right optical detector 202R emit lights in the sector shape, the laser beams are emitted to the whole area of the coordinate input screen 112.

Light emitted to the coordinate input screen 112 is reflected from the retroreflector 201. The retroreflector 201 is a member that reflects the light over an angle range of 180 degrees. For example, the retroreflector 201 receives an irradiated light p1 shown in the figure, and reflects this light as a reflected light p2 that passes through an optical axis that is parallel with the optical axis of the irradiated light p1. When there is no object that interrupts the light on the coordinate input screen 112, the left optical detector 202L and the right optical detector 202R receive all the reflected lights emitted from these optical detectors respectively. However, when a finger or a pen touches the coordinate input screen 112, the left optical detector 202L and the right optical detector 202R do not receive the light that passes through the touch point.

The information about the light detected by the left optical detector 202L and the right optical detector 202R respectively is input to the coordinate detector 3 as analog data. The coordinate detector 3 obtains angles (light blocking angles) θL and θR formed between a straight line that passes the light receivers of the left optical detector 202L and the right optical detector 202R, and each straight line from each of the light receivers to a touch point t. More specifically, each of the angles is obtained based on the optical axis of light supposed to be received at a position where the light receiver has not received the light, out of the light emitted in the sector shape. The coordinates (x, y) of the touch point t are calculated based on the angles θL and θR, as follows.

$$x = W \times \tan θR / (\tan θL + \tan θR)$$

$$y = H - W \times \tan θL \times \tan θR / (\tan θL + \tan θR)$$

A format of detection data and a format of mouse data is explained next with reference to FIGS. 4A and 4B. FIG. 4A shows a format of detection data, and FIG. 4B shows a format of mouse data.

As shown in FIG. 4A, the detection data includes information about an X coordinate of a touch point, a Y coordinate of the touch point, and a coordinate status of the touch point. The coordinate status indicates whether the detection data is the touch, the detouch, the sliding touch, or the same-position touch, by using 1 or 0. In a field of the sliding touch and the same-position touch, 1 is set when the touch is in the state of either the sliding touch or the same-position touch. It is decided whether the touch is in the state of the sliding touch or the same-position touch, by comparing the coordinates of the data detected this time with the coordinates of the data detected last time.

As shown in FIG. 4B, the mouse data includes information about an X coordinate of a touch point, a Y coordinate of the touch point, and a mouse status. The mouse status indicates the ON/OFF of the mouse right button, and the ON/OFF of the mouse left button, by using 1 or 0. The touch, the detouch, the sliding touch, and the same-position touch are set in relation to any one of the ON or OFF of the mouse right button and the ON or OFF of the mouse left button. As explained above, the mouse status is related in advance with the information about the touch, the detouch, etc. on the driver control panel of the host unit 4. In other words, the mouse status includes the information corresponding to the coordinate status of the detection data.

The mouse data generated in the manner as described above is delivered to the APL 111 of the host unit 4. The function of deciding a graphics drawn manually in the APL 111 is explained next. The APL 111 includes the touch point locus detector 120, the suspended touch detector 122, the graphics identifying section 124, and the graphics display section 126, as described above with reference to FIG. 2.

The touch point locus detector 120 detects a graphics drawn manually, that is, a locus of a touch point, from the mouse data received from the driver 108. The suspended touch detector 122 detects which one of the touch, the detouch, the sliding touch, and the same-position touch the mouse status of the mouse data received from the driver 108 indicates. When mouse data that continuously shows the same-position touch during a period of at least a predetermined sliding time is received, the suspended touch detector 122 also detects the suspended touch. Based on the detection of the suspended touch, the suspended touch detector 122 recognizes the end of the drawing, and notifies the graphics identifying section 124 and the graphics display section 126 of a result of the detection.

When the suspended touch detector 122 detects the suspended touch, the graphics identifying section 124 identifies a graphics shown by the locus of the touch point detected by the touch point locus detector 120. A graphics deciding method in the graphics identifying section 124 is explained later.

While the suspended touch detector 122 detects a touch and sliding, the graphics display section 126 displays on the display screen 113 the image data prepared based on the touch point locus detected by the suspended touch detector 122. When the graphics identifying section 124 has been successful in deciding a graphics, the graphics display section 126 displays the image data as the decided graphics on the display screen 113.

An algorithm that the graphics identifying section 124 identifies a graphics is explained next with reference to FIG. 5 to FIG. 9.

In the embodiment, the patterns to be decided by the graphics identifying section 124 include a straight line, an arrow, a triangle, a rectangle, a circle, and an oval. When an arrow, a triangle, or a rectangle is drawn, a drawing vector representing a manual drawing direction of a graphics has significant changes in the drawing direction in the middle of the drawing. The graphics identifying section 124 detects these changes in the direction, and identifies a manually drawn graphics, that is, a shape of the touch point locus, based on the detected changes in the direction.

Figure 5:
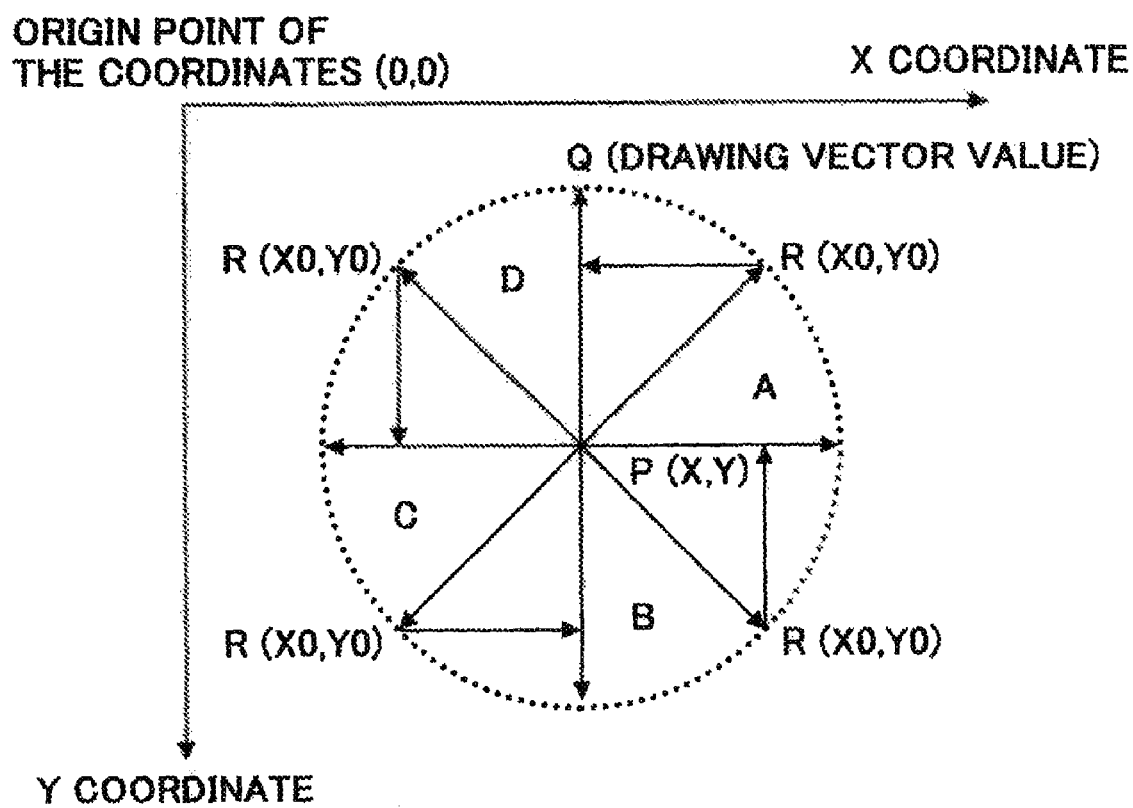
FIG. 5 shows a drawing vector utilized to decide a change in the direction according to the embodiment.

FIG. 5 shows a drawing vector utilized when the graphics identifying section 124 identifies a change in the direction. A method of deciding a directional change is explained below with reference to FIG. 5.

Coordinates of a position of the touch detected last time are expressed as P (X, Y), and coordinates of a position of the touch detected this time are expressed as R (X0, Y0). A value of a change in the direction of a drawing vector (PR) relative to a vector Q shown in FIG. 5, that is, a change value V, is defined as follows.

When the last time coordinate point P is a reference point, and when X0≧X, and Y0<Y, that is, the coordinate point R this time is within a range A, V is expressed as follows.

$$V=(\arctan((X0-X)/(Y-Y0)))/N$$

When X0≧X, and Y0≧Y, that is, the coordinate point R this time is within a range B, V is expressed as follows.

$$V=(\arctan((Y0-Y)/(X0-X)))/N+90/N$$

When X0<X, and Y0≧Y, that is, the coordinate point R this time is within a range C, V is expressed as follows.

$$V=(\arctan((X-X0)/(Y0-Y)))/N+180/N$$

When X0<X, and Y0<Y, that is, the coordinate point R this time is within a range D, V is expressed as follows.

$$V=(\arctan((Y-Y0)/(X-X0)))/N+270/N$$

When a direction of the drawing vector in the drawing of an arrow, a triangle, and a rectangle is to change, the drawing vector changes by approximately 90 degrees or more relative to the vector Q. When there is a change in the direction by at least this angle, it is decided that there has been a directional change. In the embodiment, 70 degrees is assumed as a reference angle in deciding a directional change. A decision value M is set based on the reference angle. In this case, M=70/N (where N represents a unit of a division in a drawing direction).

In deciding whether an arbitrary coordinate involves a directional change, the graphics identifying section 124 calculates a change value V of the drawing vector at the arbitrary coordinate. When V is equal to or larger than M, the graphics identifying section 124 decides that there has been a directional change in the arbitrary coordinate. In this manner, the graphics identifying section 124 can discriminate a straight line, an arrow, a triangle, and a rectangle from one another based on the directional change.

Figure 6A:
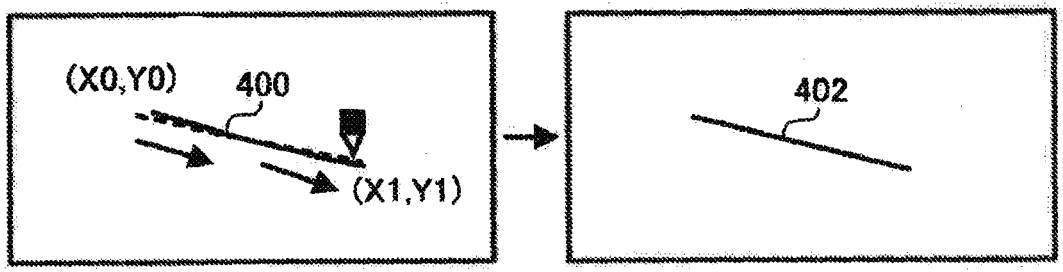
FIGS. 6A and 6B show touch point locus of touches according to the embodiment.

FIG. 6A shows a touch point locus 400 of a touch made by an object on the touch panel 1. The drawing vector of each point from a touch point (X0, Y0) to a detouch point (X1, Y1) is always directed to substantially the same direction. There is also shown no particular rule in the quantity of the directional change in the portion from the touch point to the detouch point. If the direction of the drawing vector is always substantially the same and also if there is no rule shown in the quantity of the directional change, the graphics identifying section 124 identifies this touch point locus 400 as a straight line 402.

When a difference between X values (|X1−X0|) and a difference between Y values (|Y1−Y0|) at the touch point and the detouch point are at least a predetermined value respectively, the graphics identifying section 124 identifies this locus as a straight line that is not parallel with either the X axis or the Y axis. It is preferable that the predetermined value is about five points, for example.

According to the touch point locus 400 shown in FIG. 6A, the difference between X values and the difference between Y values at the touch point and the detouch point are at least the predetermined value respectively. Therefore, the touch point locus 400 is decided as the straight line 402.

Figure 6B:
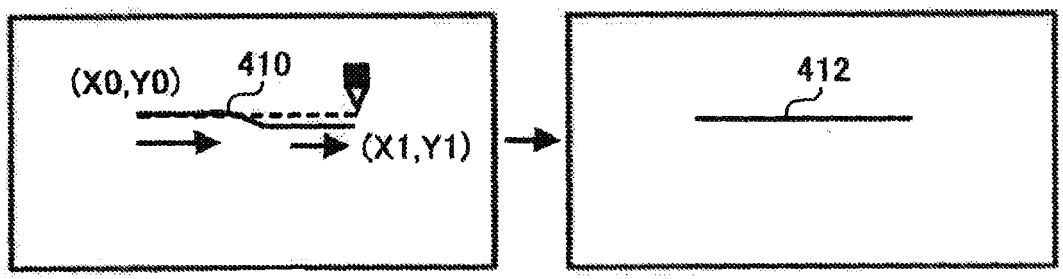

Similarly, the graphics identifying section 124 identifies a touch point locus 410 shown in FIG. 6B as a straight line like the touch point locus 400 shown in FIG. 6A. However, a difference between X values at the touch point and the detouch point of the touch point locus 410 shown in FIG. 6B is smaller than the decision value M. When a difference between X values at the touch point and the detouch point is smaller than the decision value M, the graphics identifying section 124 identifies the touch point locus 410 as a horizontal line 412, that is, a straight line perpendicular to the Y axis.

When the operator tries to input a horizontal line by touching the coordinate input screen, it is anticipated that the line may be slightly deviated from a horizontal direction. To overcome this problem, the graphics identifying section 124 regards a change between the X values within a certain range as an error, and identifies the line as a horizontal line. Consequently, the operator can easily draw a horizontal line based on a rough touch on the coordinate input screen.

Although not shown in the figure, the graphics identifying section 124 can also decide a vertical line in a similar manner to that of the horizontal line. In other words, when a difference between Y values at the touch point and the detouch point is smaller than a decision value in the touch point locus that is decided as a straight line, the graphics identifying section 124 identifies this straight line as a vertical line.

Figure 7:
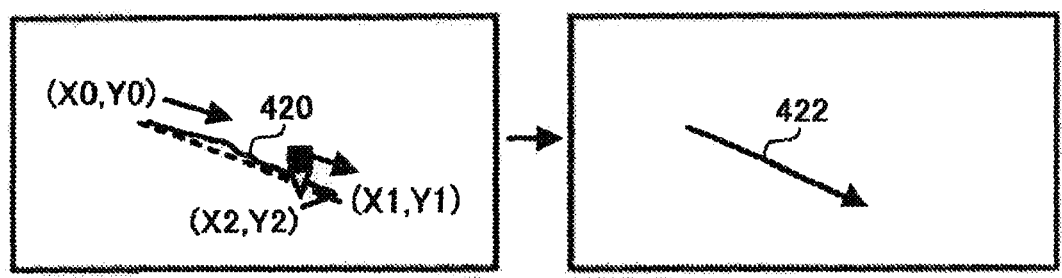
FIG. 7 shows a drawing of an arrow according to the embodiment.

A touch point locus 420 shown in FIG. 7 includes one directional change point (X1, Y1) that causes a change value V of a drawing vector to be at least the decision value M between a touch point (X0, Y0) and a detouch point (X2, Y2). When the touch point locus 420 includes one directional change point like this, the graphics identifying section 124 identifies this touch point locus 420 as an arrow 422. Specifically, the graphics identifying section 124 identifies the touch point locus 420 as the arrow 422 that has the touch point as a starting point and the directional change point as an end point.

Figure 8:
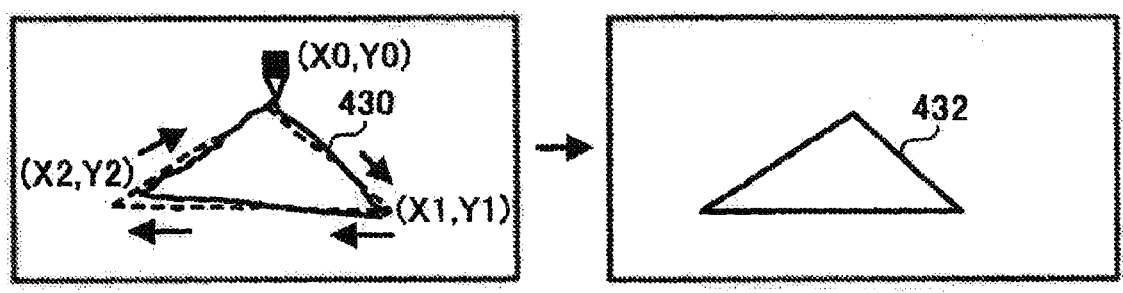
FIG. 8 shows a drawing of a triangle according to the embodiment.

A touch point locus 430 shown in FIG. 8 includes two directional change points (X1, Y1) and (X2, Y2) between a touch point (X0, Y0) and a detouch point (X0, Y0). In this case, the graphics identifying section 124 identifies the touch point locus 430 as a triangle 432. Specifically, when X1>X2, the graphics identifying section 124 identifies the touch point locus 430 as the triangle 432 having vertexes (X0, Y0), (X1, Y1), and (X, Y1). In this case, X is defined as follows.

$$X = X0 - (Y1 - Y0) \times (X0 - X2)/(Y2 - Y0)$$

X is obtained from the following relational expression.

$$(Y1 - Y0)/(X0 - X) = (Y2 - Y0)/(X0 - X2)$$

Figure 9:
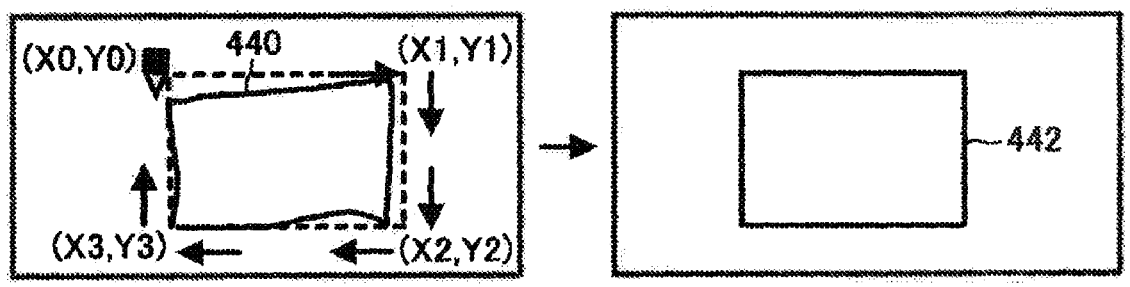
FIG. 9 shows a drawing of a rectangle according to the embodiment.

Touch point locus 440 shown in FIG. 9 includes three directional change points (X1, Y1), (X2, Y2), and (X3, Y3) between a touch point (X0, Y0) and a detouch point (X0, Y0). In this case, the graphics identifying section 124 identifies the touch point locus 440 as a rectangle 442. Specifically, the graphics identifying section 124 identifies the touch point locus 440 as a rectangle 442 that have vertexes at a point (Xi, Yi), a point (Xm, Yi), a point (Xm, Ym), and a point (Xi, Ym). In this case, Xi denotes a minimum value of X0, X1, X2, and X3, Xm denotes a maximum value of X0, X1, X2, and X3, Yi denotes a minimum value of Y0, Y1, Y2, and Y3, and Ym denotes a maximum value of Y0, Y1, Y2, and Y3.

Figure 10A:
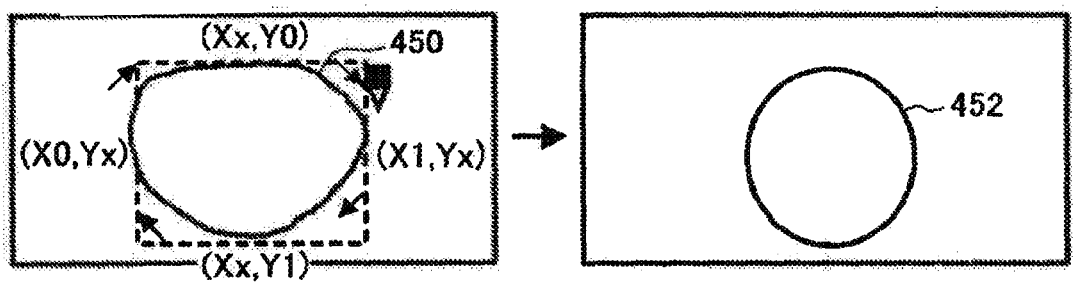
FIGS. 10A and 10B show a drawing of a circle and a drawing of an oval according to the embodiment.

In a touch point locus 450 shown in FIG. 10A, a drawing vector at each point from a touch point (X0, Y0) to a detouch point (X0, Y0) has a directional change of always substantially the same quantity. In this case, the graphics identifying section 124 identifies the touch point locus 450 as a circle 452. The graphics identifying section 124 can also distinguish between a circle and an oval. Assume that X0 denotes a minimum X coordinate, X1 denotes a maximum X coordinate, Y0 denotes a minimum Y coordinate, and Y1 denotes a maximum Y coordinate of the touch point locus 450 respectively. Only when a difference between (X1−X0) and (Y1−Y0) is not equal to nor larger than two times of (X1−X0) or (Y1−Y0), the graphics identifying section 124 identifies the touch point locus 450 as a circle. Specifically, the graphics identifying section 124 identifies a circle based on the following definitions.

A center of a circle=((X0+X1)/2), ((Y0+Y1)/2)

A diameter of the circle=((X1−X0)+(Y1−Y0))/2

Figure 10B:
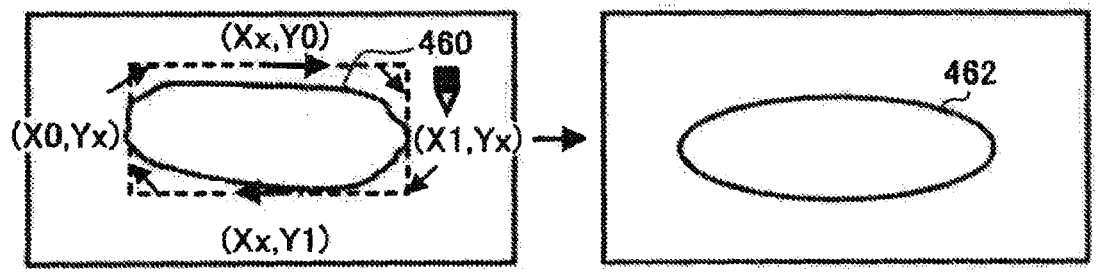

As shown in FIG. 10B, when a difference between (X1−X0) and (Y1−Y0) is at least equal to two times of (X1−X0) or (Y1−Y0), the graphics identifying section 124 identifies a touch point locus 460 as an oval. Specifically, the graphics identifying section 124 identifies the touch point locus 460 as an oval 462 based on the following definitions.

A center of an oval=((X0+X1)/2), ((Y0+Y1)/2)

A length of the X axis of the oval=(X1−X0)/2

A length of the Y axis of the oval=(Y1−Y0)/2

Figure 11:
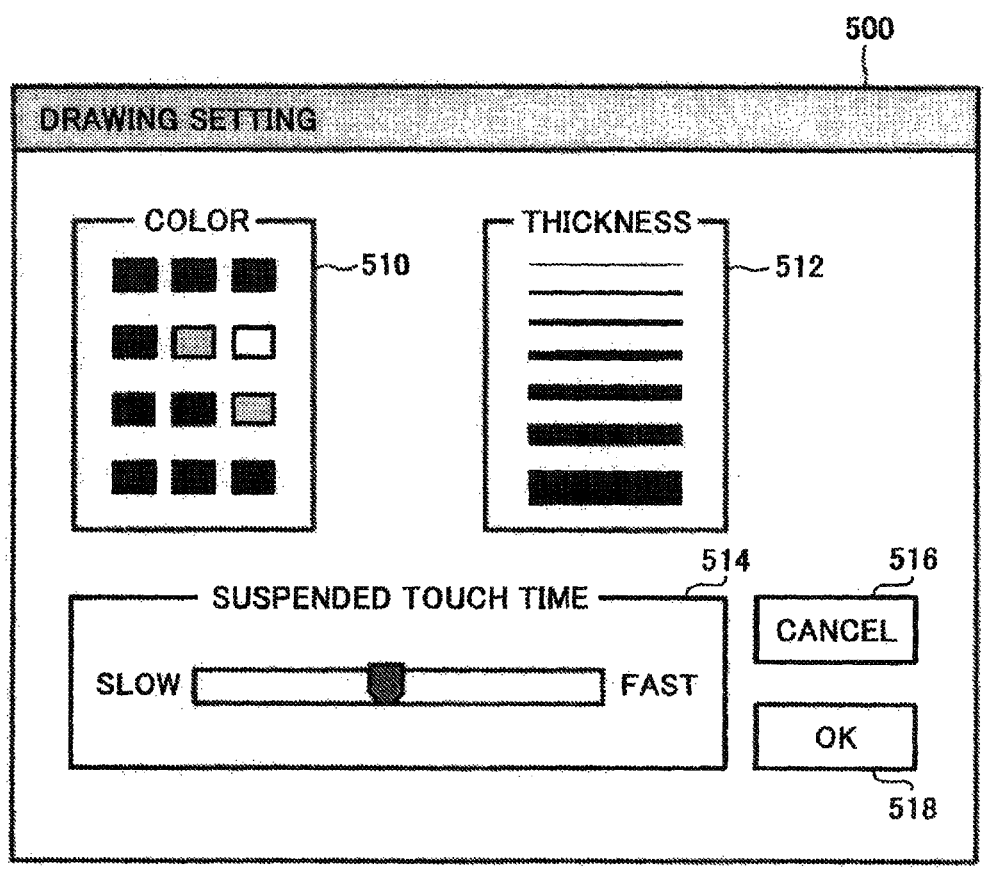
FIG. 11 shows an image displayed on a display screen at the time of setting drawing conditions.

FIG. 11 shows a dialog box 500 displayed on the display screen 113 at the time of setting drawing conditions. The dialog box 500 is started with an executing unit like a pull-down menu. The dialog box 500 includes a color setting box 510, a thickness setting box 512, a suspended touch time setting box 514, a cancellation button 516, and an OK button 518. At the time of drawing a graphics on the touch panel based on the display of the color setting box 510 and the thickness setting box 512, the operator can set a color and a thickness of a line to be displayed on the display screen 113. The operator can also set a time period that is regarded as the suspended touch, on the suspended touch time setting box 514.

Figure 12:
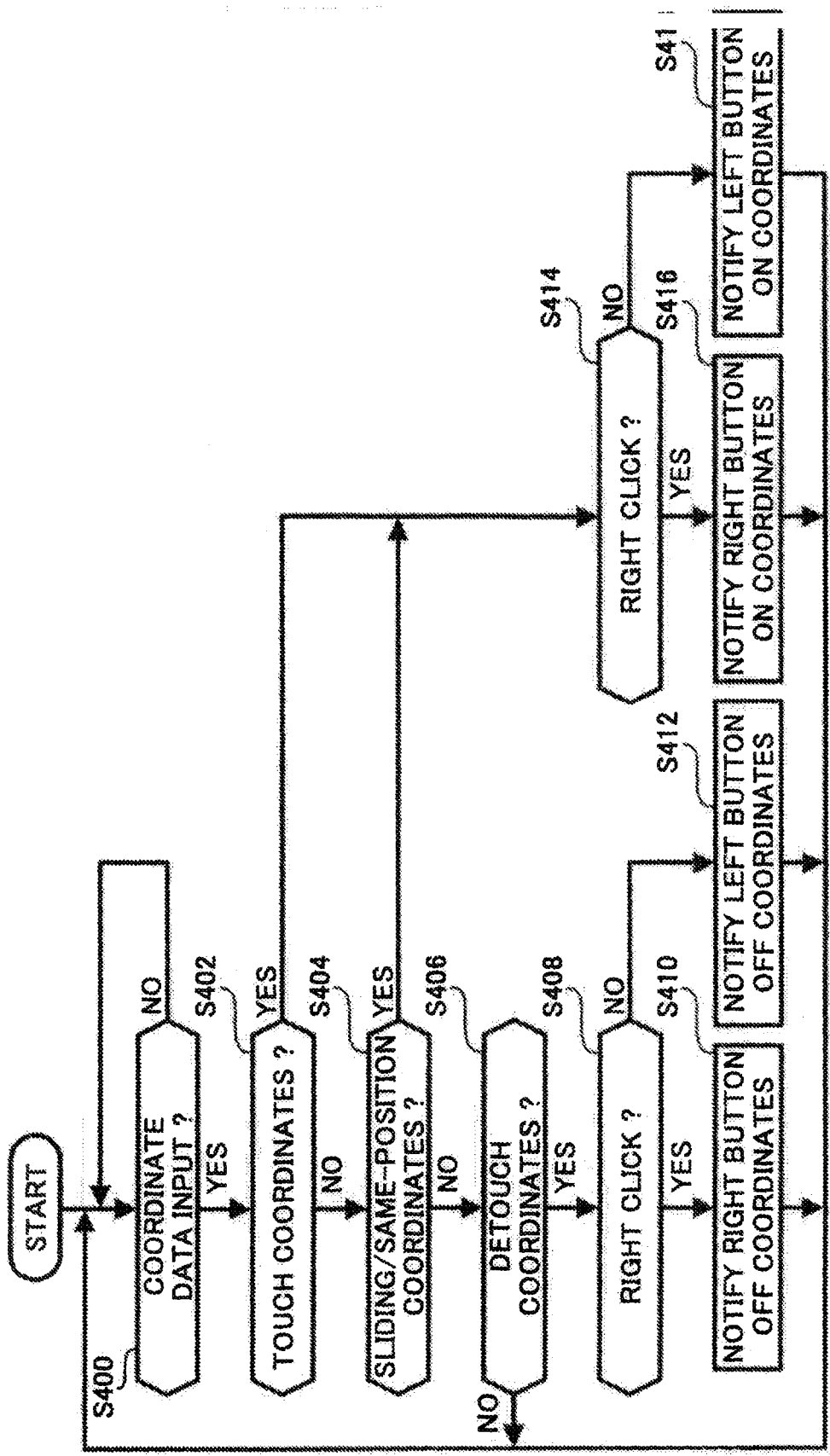
FIG. 12 is a flowchart of a display control that a driver 108 carries out when the driver 108 converts detection data into mouse data.

A method of controlling the display unit with a touch panel is explained with reference to a flowchart. FIG. 12 is a flowchart of a control performed when the driver 108 converts detection data received from the coordinate detector 3 into mouse data.

When the coordinate input unit 1 detects a touch with a finger or the like, the driver 108 receives detection data from the coordinate input unit 1 (S400). When the coordinate status of the received detection data is the touch (Yes at S402), the driver 108 determines whether the touch operation corresponding to the detection data is set as the right click or the left click, according to the setting of the driver control panel set in advance (S414). When the touch operation is set as the right click (Yes at S414), the driver 108 sets the right button ON in the mouse status (S416). When the touch operation is set as the left click (No at S414), the driver 108 sets the left button ON in the mouse status (S418).

When the coordinate status of the received detection data is the sliding touch or the same-position touch (Yes at S404), the process proceeds to step S414. The driver 108 sets the right button ON or the left button ON in the mouse status, in a similar manner to that of the coordinates for the touch. In the embodiment, the touch, the sliding touch, and the same-position touch are set in relation to the left button ON.

When the coordinate status of the received detection data is the detouch (Yes at S406), the driver 108 determines whether the touch operation corresponding to the detection data is set as the right click or the left click, according to the setting of the driver control panel set in advance (S408). When the touch operation is set as the right click (Yes at S408), the driver 108 sets the right button OFF in the mouse status (S410). When the touch operation is set as the left click (No at S408), the driver 108 sets the left button OFF in the mouse status (S412). In the embodiment, the detouch is set in relation to the left button OFF. Based on the above operation, the driver 108 converts the detection data into mouse data, each time when the detection data is received.

Figure 13:
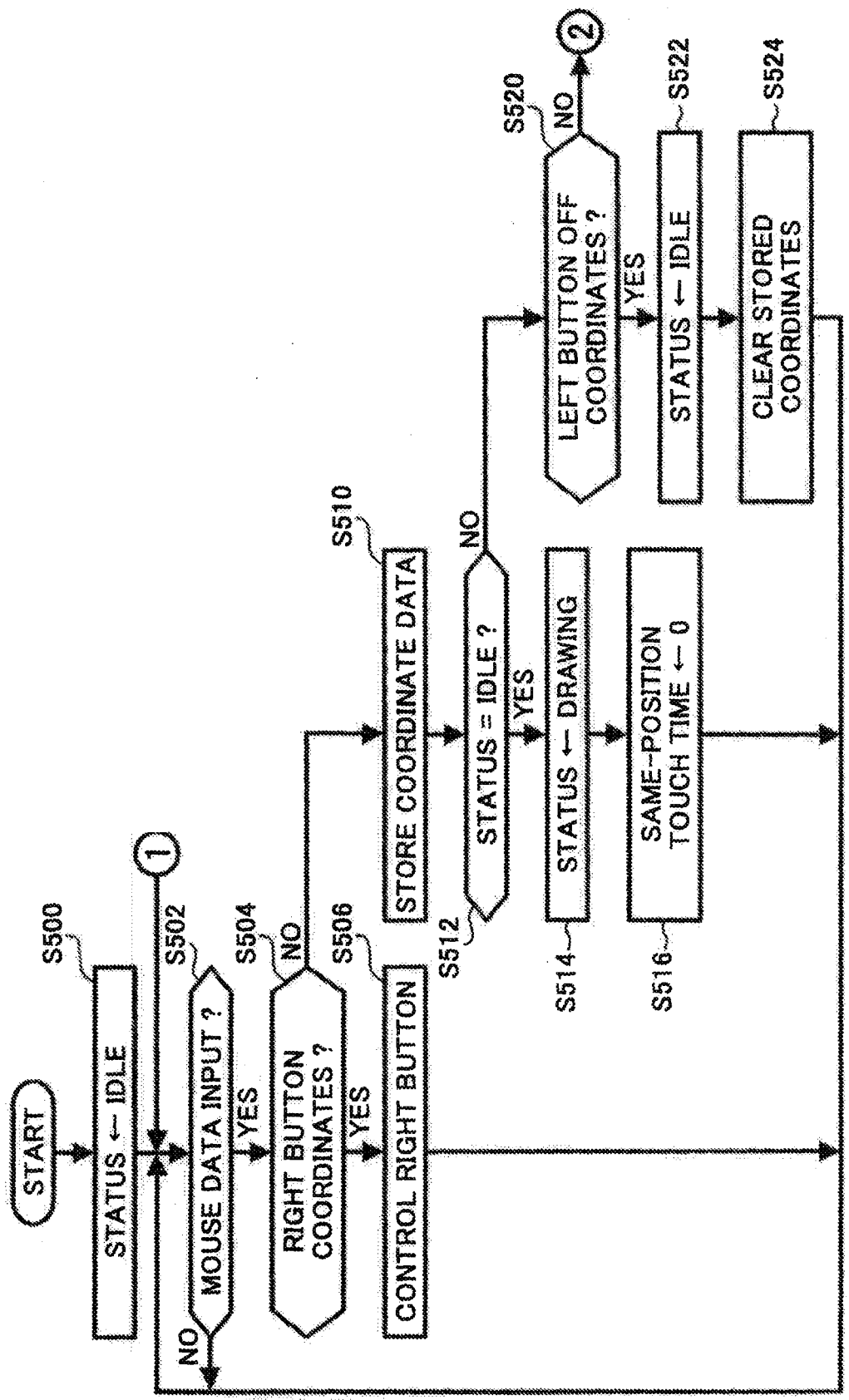
FIG. 13 is a flowchart of a control processing that a host unit 4 carries out.
Figure 14:
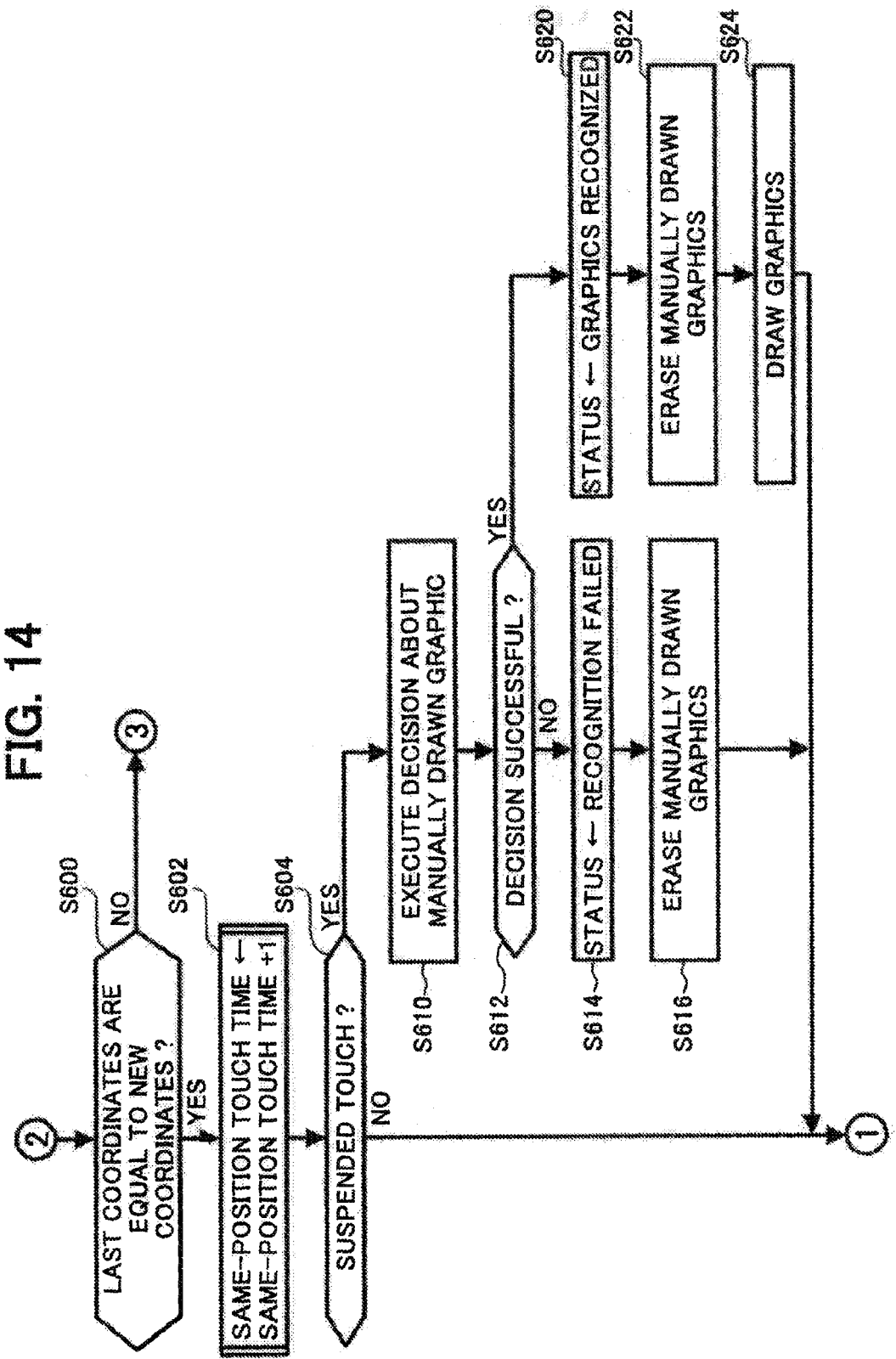
FIG. 14 is a flowchart of a processing at step S600 and afterward that follows the control processing shown in FIG. 13.
Figure 15:
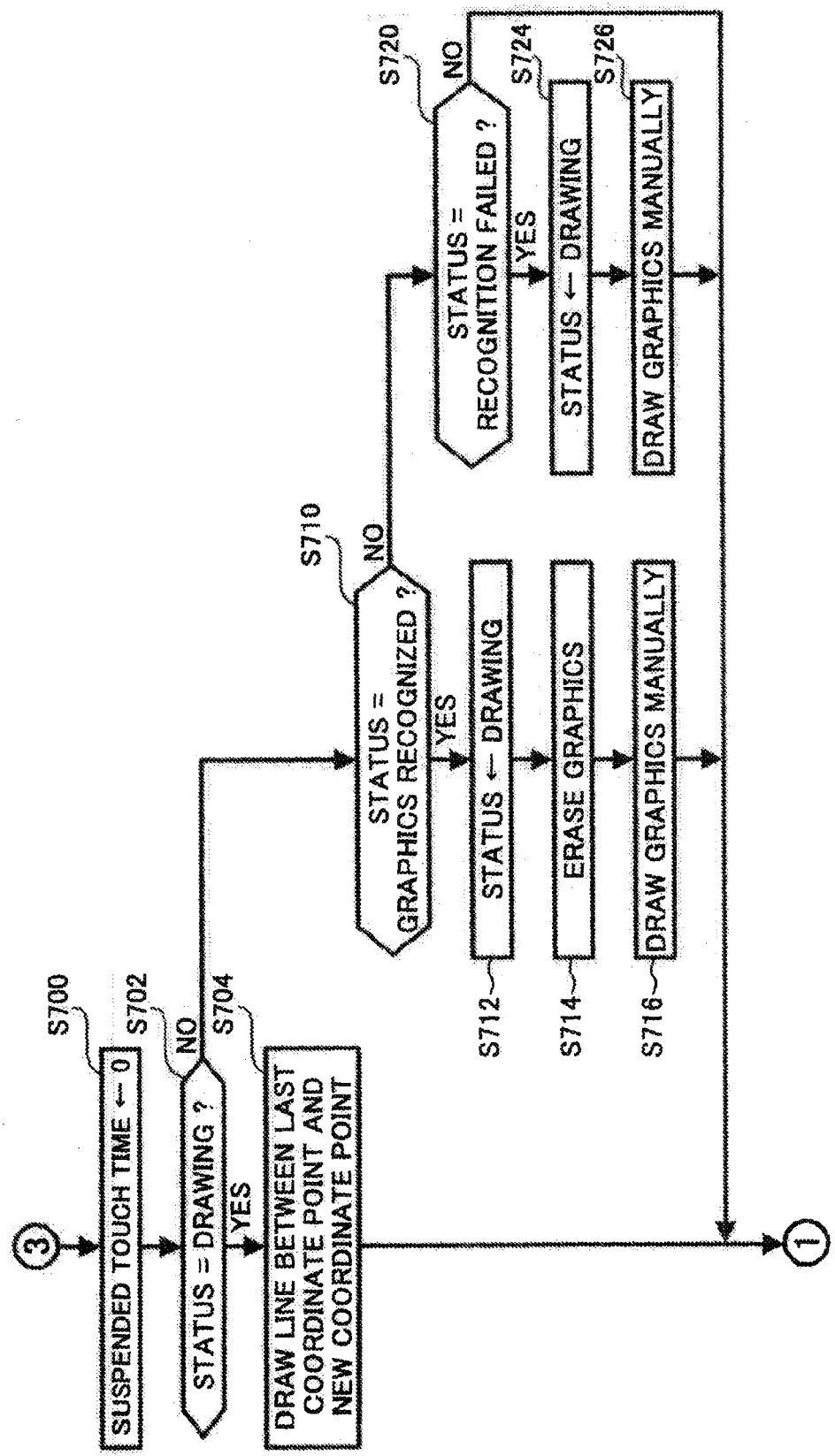
FIG. 15 is a flowchart of a processing at step S700 and afterward that follows the control processing shown in FIG. 14.
Figure 16A:
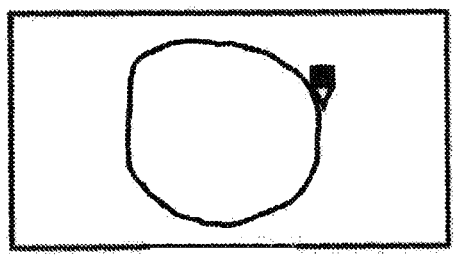
FIGS. 16A to 16E show screens displayed on the display screen when the host unit 4 carries out the control processing.
Figure 16B:
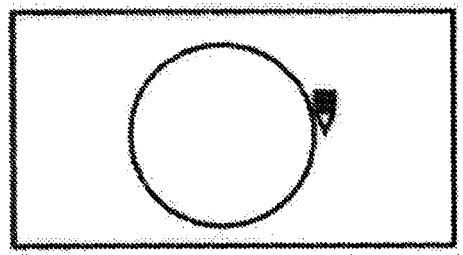
Figure 16C:
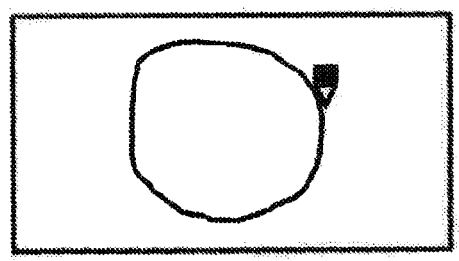
Figure 16D:
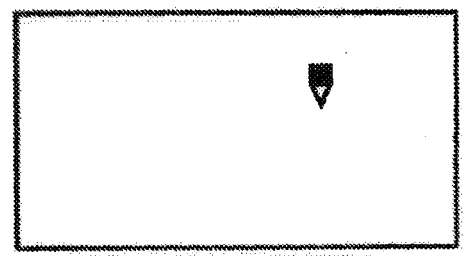
Figure 16E:
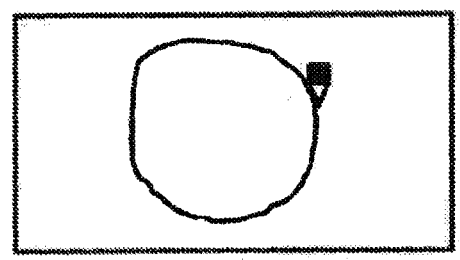

The control processing carried out by the host unit 4 is explained next with reference to FIG. 13 to FIG. 16. FIG. 13 to FIG. 15 are flowcharts of the control processing that the host unit 4 carries out. FIGS. 16A to 16E show screens displayed on the display screen 113 when the host unit 4 carries out the control processing.

An idle status ("idle") is set in an operating state status ("state status" hereinafter, and simply "status" in figures) as a default value (S500). When the OS gives the execution right to the touch point locus detector 120 to detect a manual drawing, that is, touch points, the host unit 4 preferentially receives the mouse data. When the APL 111 receives the mouse data (Yes at S502), the host unit 4 determines whether the mouse data indicates the right button. When the mouse data indicates the right button (Yes at S504), the host unit 4 executes the processing related to the right button (S506). The processing that the host unit 4 executes this time is, for example, the control of a shortcut menu.

When the mouse data indicates the left button (No at S504), the touch point locus detector 120 temporarily stores the coordinate data included in the mouse data (S510). When the current state status is "idle" (Yes at S512), the host unit 4 sets "drawing" in the state status (S514). Next, the suspended touch detector 122 sets 0 as a time period for the same-position touch. In other words, the suspended touch detector 122 clears the time period for the same-position touch (S516). As explained above, when the state status changes to drawing, the host unit 4 prepares for the detection of the suspended touch.

When "idle" is not set in the state status at step S512 and the left button OFF is set, that is, the finger or the like is in the detouched state (No at S512, and Yes at S520), the host unit 4 sets "idle" in the state status (S522). Further, the host unit 4 deletes the coordinate data stored by the suspended touch detector 122 (S524). The drawing mode is cleared in this way.

When the left button is set to ON at step S520 (No at S520), the process proceeds to step S600. The processing at step S600 and afterward is explained with reference to FIG. 14.

At step S600, the host unit 4 compares the coordinates of the mouse data obtained last time with the coordinates of the mouse data obtained this time. When the coordinates of the mouse data obtained last time are equal to the coordinates of the mouse data obtained this time (Yes at S600), the suspended touch detector 122 adds one to the same-position touch time (S602). As a result of this addition, when the same-position touch time reaches the suspended touch time that becomes the basis of the suspended touch detection (Yes at S604), the graphics identifying section 124 decides the graphics of the touch point locus detected by the touch point locus detector 120 (S610).

When the graphics identifying section 124 has been successful in deciding the graphics (Yes at S612), the host unit 4 sets "graphics is recognized" in the state status (S620). The graphics display section 126 erases the touch point locus, that is, the graphics manually drawn that is displayed on the display screen 113 (S622). The host unit 4 allows the graphics display section 126 to display the graphics decided by the graphics identifying section 124 (S624). At this time, the display screen 113 is changed from the manually drawn graphics shown in FIG. 16A to the decided graphics ("decision graphics") shown in FIG. 16B. When the operator suspends the touch, the decision graphics is displayed in this way. When the operator detouches the finger or the pen from the screen, the processing at steps S502 to S524 is carried out sequentially, and the decision graphics is determined.

When the graphics identifying section 124 has been unsuccessful in deciding the graphics (No at S612), the host unit 4 sets "recognition is failed" in the state status (S614). The graphics display section 126 erases the manually drawn graphics (S616). At this time, the display screen 113 is changed from the manually drawn graphics shown in FIG. 16A to the screen with no graphics shown in FIG. 16D.

As explained above, when the graphics identifying section 124 has been unsuccessful in recognizing the manually drawn graphics, the manually drawn graphics is erased automatically. Therefore, the operator does not need to ease the graphics. When the operator detouches the finger or the pen from the screen at this time, the processing at steps S502 to S524 is carried out sequentially, and the erasing of the manually drawn graphics is determined.

When it is determined that the coordinates of the mouse data obtained last time are different from the coordinates of the mouse data obtained this time (No at S600), the process proceeds to step S700. The processing at step S700 and afterward is explained below with reference to the flowchart shown in FIG. 15.

At step S700, the suspended touch detector 122 sets 0 as the time period indicating the same-position touch. As explained above, when the coordinates of the touch point moves, the operator is manually drawing a graphics. Therefore, the host unit 4 does not count the time period for the same-position touch.

When "drawing" is set in the current state status (Yes at S702), the graphics display section 126 displays a line between the coordinate point of the mouse data shown last time and the coordinate point of the mouse data shown this time (S704). As explained above, while the operator is drawing a graphics, the line corresponding to the touch point is displayed on the display screen 113.

When "graphics is recognized" is set in the state status (No at S702, and Yes at S710), the host unit 4 sets "drawing" in the state status (S712). At this time, the graphics display section 126 erases the decision graphics currently shown on the screen (S714). The graphics display section 126 displays again the touch point locus corresponding to the erased decision graphics on the display screen 113 (S716). At this time, the display screen 113 is changed from the decision graphics shown in FIG. 16B to the manually drawn graphics shown in FIG. 16C.

As explained above, it is possible to display the manually drawn graphics again even after the decision graphics has been displayed. Therefore, when the operator suspends drawing with his or her finger for some reason, and even if the touch is unintentionally recognized as the suspended touch, it is possible to display the manually drawn graphics again on the display screen 113, when the operator drags the finger or the pen without detouching.

When "recognition is failed" is set in the state status (No at S702, No at S710, and Yes at S720), the host unit 4 sets "drawing" in the state status (S724). In this case, the graphics display section 126 displays the manually drawn graphics on the display screen 113 (S726). At this time, the display screen 113 is changed from the screen with no graphics shown in FIG. 16D to the manually drawn graphics shown in FIG. 16E.

As explained above, when the graphics identifying section 124 has been unsuccessful in deciding the graphics and even after the manually drawn graphics is erased, it is possible to allow the manually drawn graphics to be displayed again when the operator drags the finger or the pen without detouching.

The control processing of the display unit with the touch panel is recorded on a computer-readable recording medium such as a compact disk read only memory (CD-ROM), a floppy disk (FD), a digital versatile disk (DVD), or the like, in a file of an installable format or an executable form.

According to the first aspect of the present invention, it is advantageously possible to provide the highly convenient display unit with the touch panel that enables a speaker to draw a graphics while standing at a desired position without moving thereby to smoothly proceed with a presentation.

According to the second aspect of the present invention, it is advantageously possible to provide the highly convenient display unit with the touch panel that enables a speaker to draw a graphics while standing at a desired position without moving, and that erases a manually drawn graphics when the display unit fails to identify a graphics thereby to facilitate the speaker to draw a graphics again and smoothly proceed with a presentation.

According to the third aspect of the present invention, it is advantageously possible to provide the highly convenient display unit with the touch panel that can easily draw a graphics again when the display unit decides a graphics as an unintended one.

According to the fourth aspect of the present invention, it is advantageously possible to provide the highly convenient display unit with the touch panel that can reliably identify a graphics in a simple operation.

According to the fifth aspect of the present invention, it is advantageously possible to provide the highly convenient display unit with the touch panel that can identify a graphics in a relatively short time.

According to the sixth aspect of the present invention, it is advantageously possible to provide the highly convenient display unit with the touch panel that can easily draw a straight line.

According to the seventh aspect of the present invention, it is advantageously possible to provide the highly convenient display unit with the touch panel that can easily decide whether a straight line is a horizontal line or a vertical line.

According to the eighth aspect of the present invention, it is advantageously possible to provide the highly convenient display unit with the touch panel that can easily draw an arrow.

According to the ninth aspect of the present invention, it is advantageously possible to provide the highly convenient display unit with the touch panel that can easily draw a triangle.

According to the tenth aspect of the present invention, it is advantageously possible to provide the highly convenient display unit with the touch panel that can easily draw a rectangle.

According to the eleventh aspect of the present invention, it is advantageously possible to provide the highly convenient display unit with the touch panel that can easily draw a circle.

According to the twelfth aspect of the present invention, it is advantageously possible to provide the highly convenient display unit with the touch panel that can easily draw an oval.

According to the thirteenth aspect of the present invention, it is advantageously possible to provide the method of controlling the highly convenient display unit with the touch panel that enables a speaker to draw a graphics while standing at a desired position without moving thereby to smoothly proceed with a presentation.

According to the fourteenth aspect of the present invention, it is advantageously possible to provide the method of controlling the highly convenient display unit with the touch panel that enables a speaker to draw a graphics while standing at a desired position without moving, and erases a manually drawn graphics when the display unit fails to identify a graphics thereby to facilitate the speaker to draw a graphics again and smoothly proceed with a presentation.

According to the fifteenth aspect of the present invention, it is advantageously possible to provide the method of controlling the highly convenient display unit with the touch panel that enables easy drawing of a graphics again when the graphics is decided as an unintentional one.

According to the sixteenth aspect of the present invention, it is advantageously possible to provide the method of controlling the highly convenient display unit with the touch panel that enables identification of a graphics in a relatively short time.

According to the seventeenth aspect of the present invention, it is advantageously possible to allow a computer to execute any of the methods of controlling the highly convenient display unit with the touch panel.

The present document incorporates by reference the entire contents of Japanese priority document, 2002-137838 filed in Japan on May 13, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A display unit with a touch panel, which displays a graphics drawn using the touch panel, the display unit comprising:
   a touch point locus detecting unit that detects a locus of continuous movement of a touch point that indicates a position of a touch made by an object on the touch panel;
   a graphics identifying unit that identifies a graphics of the locus detected by the touch point locus detecting unit;
   a graphics display unit that displays the locus detected by the touch point locus detecting unit on a display screen, erases the displayed locus after the graphics identifying unit ends the identification of the graphics, and displays the graphics obtained as a result of the identification on the display screen; and
   a suspended touch detecting unit that detects that the touch is suspended when the touch point remains at rest at one spot for at least a predetermined time period without touch release during detection of the locus by the touch point locus detecting unit, wherein
   the graphics display unit displays again the displayed locus that has been erased once when the suspended touch detection unit detects that the touch is suspended and then a dragging operation is performed on the touch panel without detouching from the touch panel after the displayed locus has been erased; and
   the graphics identifying unit identifies the graphics of the locus detected by the touch point locus detecting unit, when the suspended touch detecting unit detects that the touch is suspended.

2. The display unit according to claim 1, wherein
   the graphics identifying unit determines a result of identification of a graphics after the touch point locus detecting unit detects touch release, and
   the graphics display unit displays the graphics obtained after the determination on the display screen.

3. The display unit according to claim 1, wherein
   the graphics identifying unit detects a change in a direction of a locus detected by the touch point locus detecting unit, and identifies a graphics indicated by the locus based on the detected change in the direction.

4. The display unit according to claim 3, wherein
   when a change in the direction by at least a predetermined value is not detected during a period from when locus detection is started by the touch point locus detecting unit until the touch is released, the graphics identifying unit identifies a graphics indicated by the detected locus as a straight line.

5. The display unit according to claim 4, wherein
   the touch point locus detecting unit detects a locus of the touch point on an X-Y coordinate system, and when identifying the graphics as a straight line,
   the graphics identifying unit identifies the straight line as a vertical line when a change of the X coordinate of the touch point is within a predetermined range, and identifies the straight line as a horizontal line when a change of the Y coordinate of the touch point is within a predetermined range, either of the changes being found during a period from when the locus detection is started until touch is released.

6. The display unit according to claim 3, wherein
   when a change in the direction by at least a predetermined value is detected once during a period from when locus detection is started by the touch point locus detecting unit until the touch is released, the graphics identifying unit identifies a graphics indicated by the detected locus as an arrow.

7. The display unit according to claim 3, wherein when a change in the direction by at least a predetermined value is detected twice during a period from when locus detection is started by the touch point locus detecting unit until the touch is released, the graphics identifying unit identifies a graphics indicated by the detected locus as a triangle.

8. The display unit according to claim 3, wherein when a change in the direction by at least a predetermined value is detected three times during a period from when locus detection is started by the touch point locus detecting unit until the touch is released, the graphics identifying unit identifies a graphics indicated by the detected locus as a rectangle.

9. The display unit according to claim 3, wherein when a change in the direction is continuously detected during a period from when locus detection is started by the touch point locus detecting unit until the touch is released, the graphics identifying unit identifies a graphics indicated by the detected locus as a circle.

10. The display unit according to claim 3, wherein when a change in the direction is continuously detected during a period from when locus detection is started by the touch point locus detecting unit until the touch is released, and also when either a difference between a maximum value and a minimum value of X coordinates respectively on the locus or a difference between a maximum value and a minimum value of Y coordinates respectively on the locus is at least two times as large as the other difference, the graphics identifying unit identifies a graphics indicated by the detected locus as an oval.

11. The display unit of claim 1, further comprising: a storage unit that stores therein the locus detected by the touch point locus detecting unit even after the detected locus is erased, wherein the locus to be displayed again is the locus stored in the storage unit.

12. A display unit with a touch panel, which displays a graphics drawn using the touch panel, the display unit comprising:
a touch point locus detecting unit that detects a locus of continuous movement of a touch point that indicates a position of a touch made by an object on the touch panel;
a graphics identifying unit that identifies a graphics of the locus detected by the touch point locus detecting unit;
a graphics display unit that displays the locus detected by the touch point locus detecting unit on a display screen, erases the displayed locus and displays the graphics obtained as a result of the identification on the display screen when the graphics identifying unit has identified the graphics, and erases the displayed locus when the graphics identifying unit has failed to identify the graphics; and
a suspended touch detecting unit that detects that the touch is suspended when the touch point remains at rest at one spot for at least a predetermined time period without touch release during detection of the locus by the touch point locus detecting unit,
wherein the graphics display unit displays again the displayed locus that has been erased once when the suspended touch detection unit detects that the touch is suspended and then a drag operation is performed on the touch panel without detouching from the touch panel after the displayed locus has been erased; and the graphics identifying unit identifies the graphics of the locus detected by the touch point locus detecting unit, when the suspended touch detecting unit detects that the touch is suspended.

13. The display unit according to claim 12, wherein the graphics identifying unit determines a result of identification of a graphics after the touch point locus detecting unit detects touch release, and
the graphics display unit displays the graphics obtained after the determination on the display screen.

14. The display unit according to claim 12, wherein the graphics identifying unit detects a change in a direction of a locus detected by the touch point locus detecting unit, and identifies a graphics indicated by the locus based on the detected change in the direction.

15. The display unit according to claim 14, wherein when a change in the direction by at least a predetermined value is not detected during a period from when locus detection is started by the touch point locus detecting unit until the touch is released, the graphics identifying unit identifies a graphics indicated by the detected locus as a straight line.

16. The display unit according to claim 15, wherein the touch point locus detecting unit detects a locus of the touch point on an X-Y coordinate system, and when identifying the graphics as a straight line,
the graphics identifying unit identifies the straight line as a vertical line when a change of the X coordinate of the touch point is within a predetermined range, and identifies the straight line as a horizontal line when a change of the Y coordinate of the touch point is within a predetermined range, either of the changes being found during a period from when the locus detection is started until touch is released.

17. The display unit according to claim 14, wherein when a change in the direction by at least a predetermined value is detected once during a period from when locus detection is started by the touch point locus detecting unit until the touch is released, the graphics identifying unit identifies a graphics indicated by the detected locus as an arrow.

18. The display unit according to claim 14, wherein when a change in the direction by at least a predetermined value is detected twice during a period from when locus detection is started by the touch point locus detecting unit until the touch is released, the graphics identifying unit identifies a graphics indicated by the detected locus as a triangle.

19. The display unit according to claim 14, wherein when a change in the direction by at least a predetermined value is detected three times during a period from when locus detection is started by the touch point locus detecting unit until the touch is released, the graphics identifying unit identifies a graphics indicated by the detected locus as a rectangle.

20. The display unit according to claim 14, wherein when a change in the direction is detected continuously during a period from when locus detection is started by the touch point locus detecting unit until the touch is released, the graphics identifying unit identifies a graphics indicated by the detected locus as a circle.

21. The display unit according to claim 14, wherein when a change in the direction is detected continuously during a period from when locus detection is started by the touch point locus detecting unit until the touch is released, and also when either a difference between a maximum value and a minimum value of X coordinates respectively on the locus or a difference between a maximum value and a minimum value of Y coordinates respectively on the locus is at least two times as large as the other difference, the graphics identifying unit identifies a graphics indicated by the detected locus as an oval.

22. The display unit of claim 12, further comprising:
a storage unit that stores therein the locus detected by the touch point locus detecting unit even after the detected locus is erased, wherein the locus to be displayed again is the locus stored in the storage unit.

23. The display unit of claim 12, further comprising:
a suspended touch detecting unit that detects that the touch is suspended when the touch point remains at rest at one spot for at least a predetermined time period without touch release during detection of the locus by the touch point locus detecting unit,
wherein the graphics identifying unit identifies a graphics of the locus detected by the touch point locus detecting unit, when the suspended touch detecting unit detects that the touch is suspended.

24. A method of controlling a display unit with a touch panel, which displays a graphics drawn using the touch panel, the method comprising:
displaying, on a display screen, a locus of continuous movement of a touch point that indicates a position of a touch made by an object on the touch panel;
identifying a graphics indicated by a locus of the touch point;
erasing the displayed locus after the graphics has been identified at the step of identifying the graphics, and displaying the graphics obtained as a result of the identification, on the display screen;
detecting that the touch is suspended when the touch point remains at rest at one spot for at least a predetermined time period without touch release during detection of the locus; and
displaying again the displayed locus that has been erased once when the detecting step detects that the touch is suspended and then a dragging operation is performed on the touch panel without detouching from the touch panel after the erasing step has been performed, wherein the identifying step includes identifying the graphics of the locus when the detecting step detects that the touch is suspended.

25. The method according to claim 24, wherein
the erasing includes displaying again the locus displayed at the displaying when a drag operation is performed over the touch panel after the displayed locus is erased.

26. The method according to claim 24, wherein
the identifying includes detecting a change in the direction of the locus, and identifying a graphics indicated by the locus based on the detected change of the direction.

27. The method of claim 24, further comprising:
detecting that the touch is suspended when the touch point remains at rest at one spot for at least a predetermined time period without touch release while the touch point locus is displayed,
wherein the identifying step identifies the graphics indicated by a locus of the touch point, when the detecting step detects that the touch is suspended.

28. The method of claim 24, further comprising:
storing in a storage unit the displayed locus even after the displayed locus is erased, wherein the locus to be displayed again is the locus stored in the storage unit.

29. A method of controlling a display unit with a touch panel, which displays a graphics drawn using the touch panel, the method comprising:
displaying, on a display screen, a locus of continuous movement of a touch point that indicates a position of a touch made by an object on the touch panel;
identifying a graphics indicated by a locus of the touch point;
erasing the displayed locus after the graphics has been identified at the step of identifying the graphics and displaying the graphics obtained as a result of the identification on the display screen, and erasing the displayed locus when graphics identification is failed; and
detecting that the touch is suspended when the touch point remains at rest at one spot for at least a predetermined time period without touch release during detection of the locus,
wherein the erasing includes displaying again the displayed locus when the detecting step detects that the touch is suspended and then a drag operation is performed over the touch panel without detouching from the touch panel after the displayed locus is erased, wherein the identifying step includes identifying the graphics of the locus when the detecting step detects that the touch is suspended.

30. The method according to claim 29, wherein
the identifying includes detecting a change in the direction of the locus, and identifying a graphics indicated by the locus based on the detected change of the direction.

31. The method of claim 29, further comprising:
detecting that the touch is suspended when the touch point remains at rest at one spot for at least a predetermined time period without touch release while the touch point locus is displayed,
wherein the identifying step identifies the graphics indicated by a locus of the touch point, when the detecting step detects that the touch is suspended.

32. The method of claim 29, further comprising:
storing in a storage unit the displayed locus even after the displayed locus is erased, wherein the locus to be displayed again is the locus stored in the storage unit.

33. A computer-readable medium having encoded thereon a program for allowing a computer to execute a method of controlling a display unit with a touch panel that displays a graphics drawn using the touch panel, the method comprising:
displaying, on a display screen, a locus of continuous movement of a touch point that indicates a position of a touch made by an object on the touch panel;
identifying a graphics indicated by a locus of the touch point;
erasing the displayed locus after the graphics has been identified at the step of identifying the graphics, and displaying the graphics obtained as a result of the identification, on the display screen;
detecting that the touch is suspended when the touch point remains at rest at one spot for at least a predetermined time period without touch release during detection of the locus; and
displaying again the displayed locus that has been erased once when the detecting step detects that the touch is suspended and then a dragging operation is performed on the touch panel without detouching from the touch panel after the erasing step has been performed, wherein the identifying step includes identifying the graphics of the locus when the detecting step detects that the touch is suspended.

34. The medium of claim 33, wherein the method further comprises:

detecting that the touch is suspended when the touch point remains at rest at one spot for at least a predetermined time period without touch release while the touch point locus is displayed, wherein the identifying step identifies the graphics indicated by a locus of the touch point, when the detecting step detects that the touch is suspended.

35. The computer-readable medium of claim 33, the method further comprising:

storing in a storage unit the displayed locus even after the displayed locus is erased, wherein the locus to be displayed again is the locus stored in the storage unit.

36. A computer-readable medium having encoded thereon a program for allowing a computer to execute a method of controlling a display unit with a touch panel that displays a graphics drawn using the touch panel, the method comprising:

displaying, on a display screen, a locus of continuous movement of a touch point that indicates a position of a touch made by an object on the touch panel;

identifying a graphics indicated by a locus of the touch point; and erasing the displayed locus after the graphics has been identified at the step of identifying the graphics and displaying the graphics obtained as a result of the identification on the display screen, and erasing the displayed locus when graphics identification is failed; and detecting that the touch is suspended when the touch point remains at rest at one spot for at least a predetermined time period without touch release during detection of the locus, wherein the erasing includes displaying again the displayed locus that has been erased once when the detecting step detects that the touch is suspended and then a drag operation is performed over the touch panel without detouching from the touch panel after the displayed locus is erased, wherein the identifying step includes identifying the graphics of the locus when the detecting step detects that the touch is suspended.

37. The medium of claim 36, wherein the method further comprises:

detecting that the touch is suspended when the touch point remains at rest at one spot for at least a predetermined time period without touch release while the touch point locus is displayed, wherein the step of identifying a graphics indicated by a locus of the touch point, when the detecting step detects that the touch is suspended.

38. The computer-readable medium of claim 36, the method further comprising:

displaying in a storage unit the displayed locus even after the displayed locus is erased, wherein the locus to be displayed again is the locus stored in the storage unit.

39. An information processing apparatus, comprising:

a handwriting unit that receives coordinate information based on an input of handwriting;

a graphic identifying unit that identifies a graphic based on a locus formed by the coordinate information;

a display unit that displays a refined graphic corresponding to the graphic identified by the graphic identifying unit, and replaces the locus with the refined graphic; and a suspended touch detecting unit that detects that a touch is suspended when a touch point remains at rest at one spot for at least a predetermined time period without touch release, wherein the display unit displays the locus that has been replaced when the suspended touch detection unit detects that the touch is suspended and then a dragging operation is performed without detouching after the displayed locus has been replaced, and the graphics identifying unit identifies the graphic based on the locus formed by the coordinate information, when the suspended touch detecting unit detects that the touch is suspended.

40. The information processing apparatus of claim 39, further comprising:

a storage unit that stores therein the locus formed by the coordinate information even after the locus has been replaced, wherein the locus to be displayed again is the locus stored in the storage unit.

41. An information processing method, comprising:

receiving coordinate information based on an input of handwriting;

identifying a graphic based on a locus formed by the coordinate information;

displaying a refined graphic corresponding to the graphic identified by the graphic identifying unit, and replacing the locus with the refined graphic;

detecting that a touch is suspended when a touch point remains at rest at one spot for at least a predetermined time period without touch release; and displaying the locus that has been replaced when the detecting step detects that the touch is suspended and then a dragging operation is performed without detouching after the replacing step has been performed, wherein the identifying step includes identifying the graphic based on the locus when the detecting step detects that the touch is suspended.

42. The method of claim 41, further comprising:

storing in a storage unit the locus formed by the coordinate information even after the locus has been replaced, wherein the locus to be displayed again is the locus stored in the storage unit.

43. A computer-readable medium having encoded thereon a program for allowing a computer to execute a method, the method comprising:

receiving coordinate information based on an input of handwriting;

identifying a graphic based on a locus formed by the coordinate information;

displaying a refined graphic corresponding to the graphic identified by the graphic identifying unit, and replacing the locus with the refined graphic;

detecting that a touch is suspended when a touch point remains at rest at one spot for at least a predetermined time period without touch release; and displaying the locus that has been replaced when the detecting step detects that the touch is suspended and then a dragging operation is performed without detouching after the replacing step has been performed, wherein the identifying step includes identifying the graphic based on the locus when the detecting step detects that the touch is suspended.

44. The method of claim 43, further comprising:

storing in a storage unit the locus formed by the coordinate information even after the locus has been replaced, wherein the locus to be displayed again is the locus stored in the storage unit.

* * * * *